United States Patent
Covington et al.

(10) Patent No.: US 8,967,552 B2
(45) Date of Patent: Mar. 3, 2015

(54) DIRECT-DRIVE CONTROL OF AIRCRAFT STABILITY AUGMENTATION

(71) Applicant: Bell Helicopter Textron Inc., Fort Worth, TX (US)

(72) Inventors: Charles E. Covington, Colleyville, TX (US); Carlos A. Fenny, Arlington, TX (US); Brady G. Atkins, Mansfield, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 379 days.

(21) Appl. No.: 13/655,778

(22) Filed: Oct. 19, 2012

(65) Prior Publication Data
US 2014/0110532 A1    Apr. 24, 2014

(51) Int. Cl.
*B64C 13/40* (2006.01)
*B64C 27/59* (2006.01)
*B64C 27/605* (2006.01)
*B64C 27/00* (2006.01)

(52) U.S. Cl.
CPC ............... *B64C 27/59* (2013.01); *B64C 27/605* (2013.01); *B64C 2027/004* (2013.01)
USPC ........................................ 244/226; 244/17.13

(58) Field of Classification Search
USPC ........................ 244/226, 220, 221, 223, 17.13
See application file for complete search history.

(56) References Cited

U.S. PATENT DOCUMENTS

| | | | | |
|---|---|---|---|---|
| 3,021,097 A | * | 2/1962 | Hecht | 244/197 |
| 3,050,276 A | * | 8/1962 | Wissinger | 244/17.13 |
| 4,095,763 A | * | 6/1978 | Builta | 244/194 |
| 4,345,195 A | * | 8/1982 | Griffith et al. | 318/628 |
| 5,058,825 A | * | 10/1991 | Rabouyt | 244/17.25 |
| 2005/0173595 A1 | | 8/2005 | Hoh | |
| 2009/0266940 A1 | | 10/2009 | Miller | |
| 2011/0031346 A1 | | 2/2011 | Allieta | |

FOREIGN PATENT DOCUMENTS

| | | |
|---|---|---|
| EP | 1037130 A2 | 9/2000 |
| GB | 2065042 A | 6/1981 |

OTHER PUBLICATIONS

European Search Report in related European Application No. 13171020.4, dated Nov. 7, 2013, 3 pages.
European Examination Report in related European Application No. 13171020.4, dated Nov. 19, 2013, 8 pages.

\* cited by examiner

*Primary Examiner* — Philip J Bonzell
(74) *Attorney, Agent, or Firm* — Christopher S. Storm

(57) ABSTRACT

According to one embodiment, a stability augmentation system includes a master linkage, a stability augmentation motor, and three linkages. A first linkage is coupled to the master linkage and operable to receive movements representative of pilot commands from a pilot command system. A second linkage is coupled between the stability augmentation motor and the master linkage and operable to receive movements representative of augmentation commands from the stability augmentation motor. A third linkage is coupled to the master linkage and operable to transmit movements representative of blade position commands to a blade control system in response to the movements representative of pilot commands and the movements representative of augmentation commands.

17 Claims, 3 Drawing Sheets

DIRECT-DRIVE CONTROL OF AIRCRAFT STABILITY AUGMENTATION

TECHNICAL FIELD

This invention relates generally to aircraft stability and control augmentation systems, and more particularly, to a direct-drive control of aircraft stability augmentation.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include one or more devices to rotate, deflect, and/or adjust rotor blades.

SUMMARY

Particular embodiments of the present disclosure may provide one or more technical advantages. A technical advantage of one embodiment may include the capability to provide stability augmentation in an aircraft. A technical advantage of one embodiment may also include the capability to reduce jam-type failure modes in a stability augmentation system. A technical advantage of one embodiment may also include the capability to reduce the weight and size of a stability augmentation system. A technical advantage of one embodiment may also include the capability to eliminate gearboxes from a stability augmentation system.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
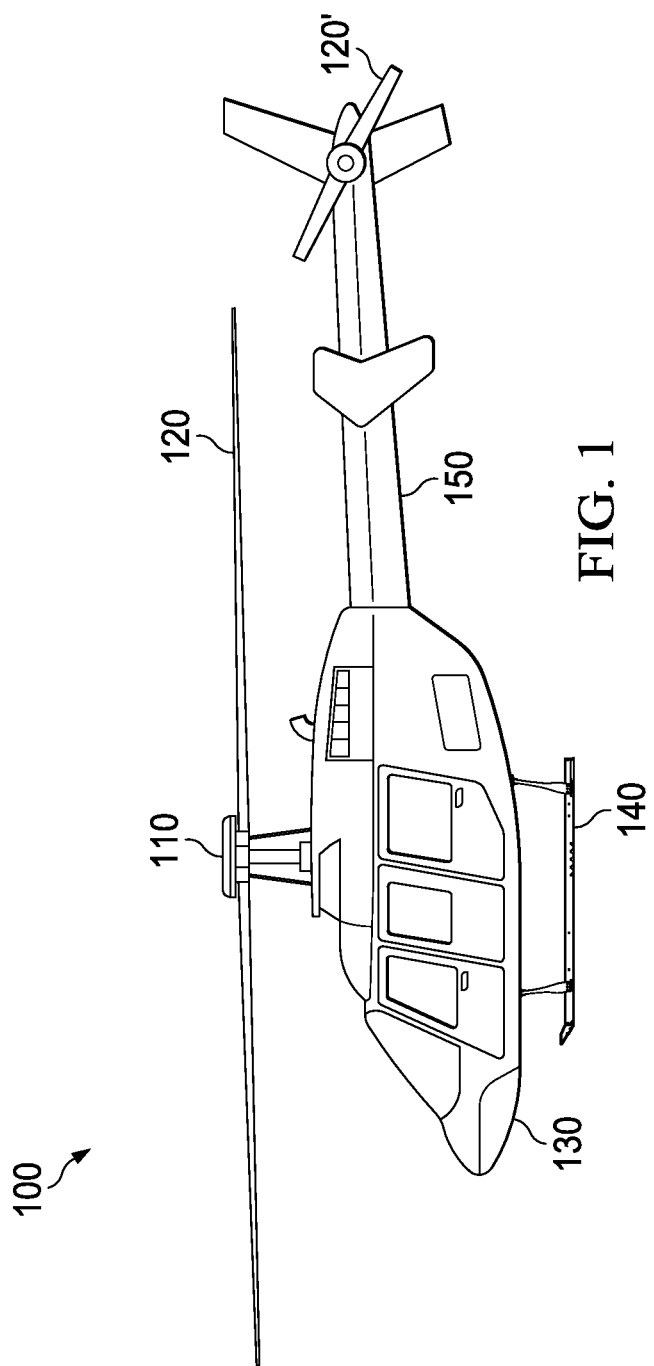
FIG. 1 shows a rotorcraft according to one example configuration.

FIG. 1 shows a rotorcraft 100 according to one example configuration. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 2:
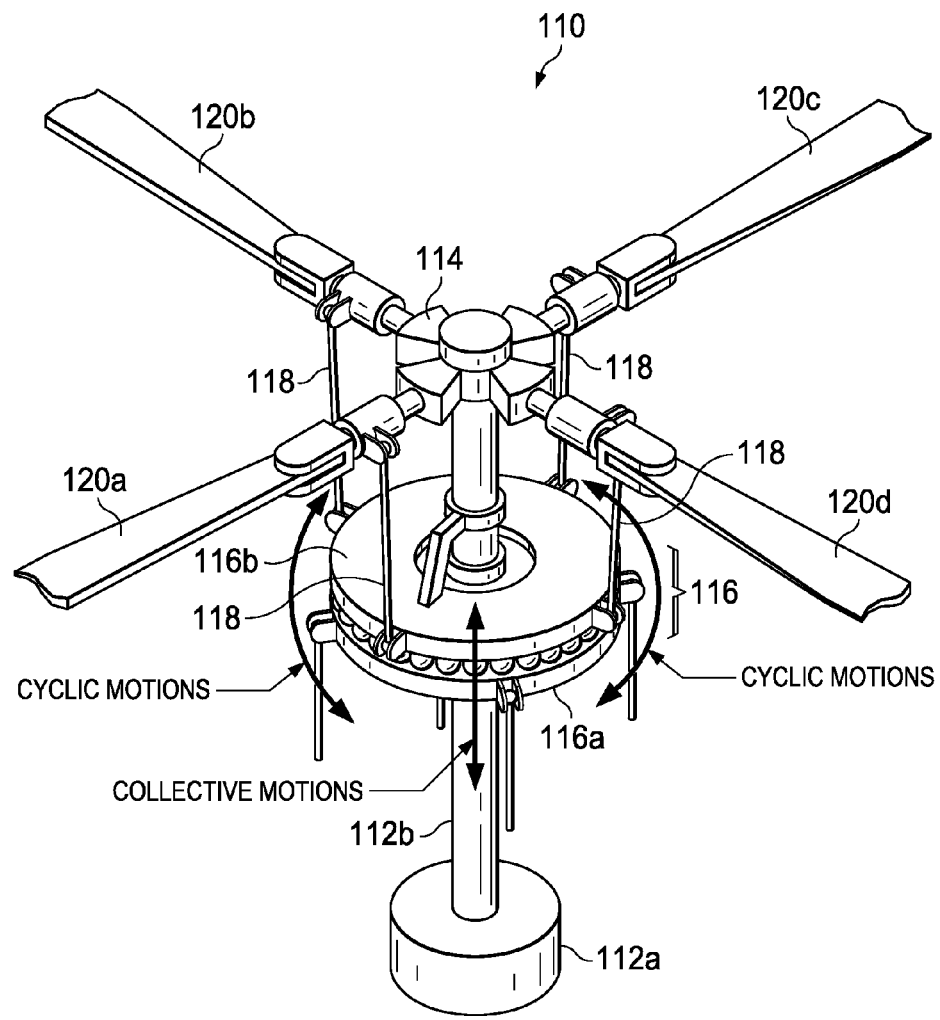
FIG. 2 shows the rotor system and blades of FIG. 1 according to one example configuration.

FIG. 2 shows rotor system 110 and blades 120 of FIG. 1 according to one example configuration. In the example configuration of FIG. 2, rotor system 110 features a power train 112, a hub 114, a swashplate 116, and pitch links 118. In some examples, rotor system 110 may include more or fewer components. For example, FIG. 2 does not show components such as a gearbox, a swash plate, drive links, drive levers, and other components that may be incorporated.

Power train 112 features a power source 112a and a drive shaft 112b. Power source 112a, drive shaft 112b, and hub 114 are mechanical components for transmitting torque and/or rotation. Power train 112 may include a variety of components, including an engine, a transmission, and differentials. In operation, drive shaft 112b receives torque or rotational energy from power source 112a and rotates hub 114. Rotation of rotor hub 114 causes blades 120 to rotate about drive shaft 112b.

Swashplate 116 translates rotorcraft flight control input into motion of blades 120. Because blades 120 are typically spinning when the rotorcraft is in flight, swashplate 116 may transmit flight control input from the non-rotating fuselage to the hub 114, blades 120, and/or components coupling hub 114 to blades 120 (e.g., grips and pitch horns). References in this description to coupling between a pitch link and a hub may also include, but are not limited to, coupling between a pitch link and a blade or components coupling a hub to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112b. In the example of FIG. 2, pitch links 118 connect rotating swashplate ring 116b to blades 120.

In operation, according to one example embodiment, translating the non-rotating swashplate ring 116a along the axis of drive shaft 112b causes the pitch links 118 to move up or down. This changes the pitch angle of all blades 120 equally, increasing or decreasing the thrust of the rotor and causing the aircraft to ascend or descend. Tilting the non-rotating swashplate ring 116a causes the rotating swashplate 116b to tilt, moving the pitch links 118 up and down cyclically as they rotate with the drive shaft. This tilts the thrust vector of the rotor, causing rotorcraft 100 to translate horizontally following the direction the swashplate is tilted.

In some examples, a stability augmentation system may be provided to the stabilize the movement of flight-control devices such as swashplate 116. In general, the inherent stability and response behavior of many modern aircraft flight-control systems may tend towards low damping or even instability. A stability augmentation system may add damping to a flight-control system to increase stability.

Figure 3:
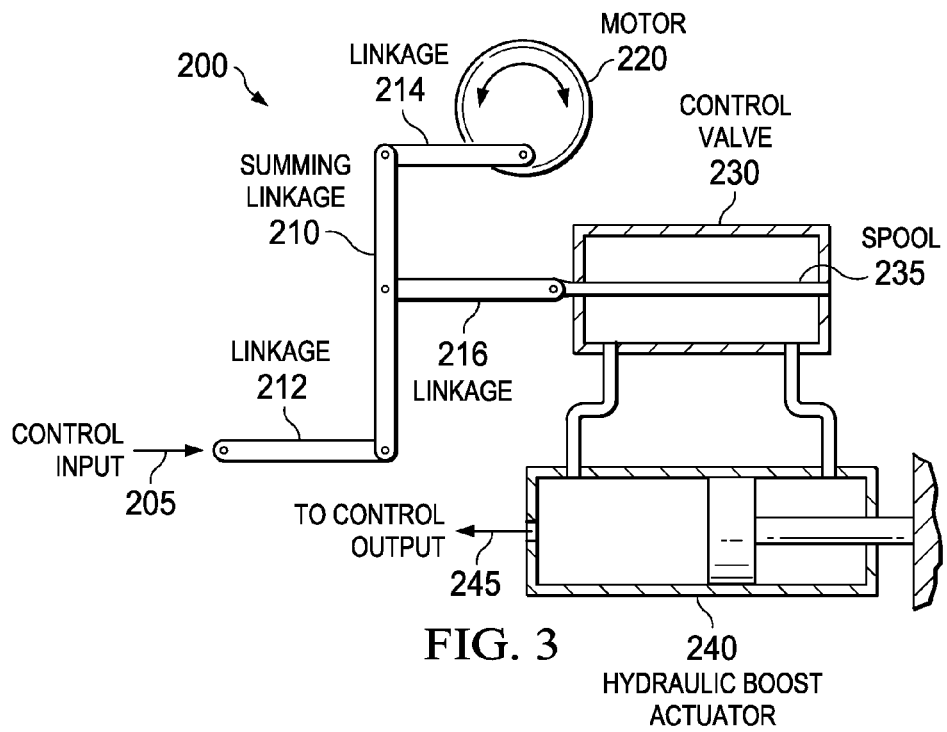
FIG. 3 shows a stability augmentation system according to one example embodiment.

FIG. 3 shows a stability augmentation system 200 according to one example embodiment. System 200 features a master linkage 210; linkages 212, 214, and 216; a stability augmentation motor 220; a control valve 230; and a hydraulic actuator 240. Teachings of certain embodiments also recognize that system 200 may include more, fewer, or different components. As one example, FIG. 3 does not show components that may mechanically and/or hydraulically link the swashplate 116 of FIG. 2 to the hydraulic actuator 240 of FIG. 3.

Master linkage 210 and linkages 212, 214, and 216 may be constructed from any suitable material. In some embodiments, master linkage 210 and linkages 212, 214, and 216 may be considered rigid, and the connections between the linkages may be considered joints.

In the example of FIG. 3, the joint between master linkage 210 and linkage 214 may operate as an adjustable fulcrum. In this manner, control input 205 may cause the joint between master linkage 210 and linkage 212 to rotate about the joint between master linkage 210 and linkage 212. The joint between master linkage 210 and linkage 216 may move in response to this rotation, causing linkage 216 to move. The position of the joint between master linkage 210 and linkage 214 is adjustable by motor 220. For example, motor 220 may reposition linkage 214 such that the joint between master linkage 210 and linkage 214 moves to a different position.

Stability augmentation motor 220 moves linkage 214. In some embodiments, stability augmentation motor 220 may be a torque motor. In some embodiments, stability augmentation motor 220 may provide a substantially constant torque over a limited range. In the example of FIG. 3, motor 220 is shown as a rotary motor, but embodiments of system 200 may also include a linear motor. In some embodiments, system 200 may include two or more stability augmentation motors 220. For example, a fourth linkage may couple a second motor to master linkage 210 proximate to the joint between master linkage 210 and linkage 214. In this and other examples, the torque provided by two or more motors may be mechanically summed at master linkage 210.

Control valve 230 and hydraulic actuator 240, in combination, may convert movements of linkage 216 into a control output 245. In the example of FIG. 3, control valve 230 includes a spool 235 that is coupled to linkage 216. Moving spool 235 may open and close passages within control valve 230 which, in turn, may change the hydraulic pressures within hydraulic actuator 240. A change in hydraulic output pressure by hydraulic actuator 240 may represent one example of a control output 245. The control output 245 may move an aircraft control device (e.g., swashplate 116). For example, control output 245 may represent a change in hydraulic pressure by hydraulic actuator 240, which may cause swashplate 116 to change position.

In operation, according to one example embodiment, stability augmentation motor 220 repositions linkage 214 to provide stability augmentation to system 200. For example, the aircraft control device associated with control output 245 may tend toward low damping or even instability. In this example, low damping or instability may cause hydraulic actuator 240 to oscillate or vibrate, which may result in spool 235 and linkage 216 oscillating or vibrating as well. Without motor 220 and linkage 214, oscillations and vibrations in linkage 216 could cause linkage 212 to oscillate and vibrate. In a mechanical flight control system, oscillations and vibrations in linkage 212 could cause the pilot control stick to oscillate and vibrate. Motor 220, however, may reduce or even eliminate pilot control stick oscillations and vibrations by moving linkage 214 to counteract oscillations and vibrations in linkage 216. For example, if linkage 216 moves master linkage 210, motor 220 could move linkage 214 in such a manner so as to keep the joint between master linkage 210 and linkage 212 in approximately the same position. Thus in this example, motor 220 and linkage 214 may provide stability augmentation to system 200 by counteracting the oscillations and vibrations in linkage 216.

Teachings of certain embodiments recognize that master linkage 210 may act as a "summing" linkage by mechanically summing inputs from linkage 212 and linkages 214 and providing the summed mechanical output to linkage 216. For example, linkage 212 may provide a mechanical input to linkage 216 through master linkage 210, but linkage 214 may be moved so as to add to or subtract from this mechanical input. If the mechanical input from linkage 212 would result in linkage 216 moving a certain distance in a certain direction, for example, moving linkage 214 may change the distance that linkage 216 moves and/or change the direction in which linkage 216 moves.

In some circumstances, linkage 216 may oscillate or vibrate at a high frequency. In this example, teachings of certain embodiments recognize that motor 220 may oscillate linkage 214 at a sufficiently high frequency so as to counteract the oscillations of linkage 216. Teachings of certain embodiments recognize that a limited-angle torque motor may provide torque with sufficient control, precision, and bandwidth so as to counteract the oscillations of linkage 216. Teachings of certain embodiments recognize that motor 220 may provide sufficient torque without the use of gearboxes and other devices designed to multiple the torque output. Such gearboxes may add complexity and weight and may limit the ability of motor 220 to control the position of linkage 214.

Teachings of certain embodiments recognize that system 200 may continue to operate even if motor 220 fails. In particular, the pilot may continue to control the aircraft even if motor 220 fails. If motor 220 stops operating, for example, linkage 214 may become fixed by motor 220 while still allowing master linkage 210 and linkages 212 and 216 to move. In this example, the pilot control stick may oscillate and vibrate, but the pilot would still have the ability to control the aircraft control devices.

In the example of FIGS. 1-3, the aircraft control device in communication with hydraulic actuator 240 is a rotor flight control device such as swashplate 116. Teachings of certain embodiments recognize, however, that system 200 may operate with a variety of flight control devices on a variety of aircraft. As one non-limiting example, system 200 may provide stability augmentation for aileron, flap, and/or rudder controls on an airplane.

In some embodiments, motor 220 may be controlled and/or monitored by a flight control computer. For example, a flight control computer may instruct motor 220 on how to move linkage 214 so as to counteract the oscillations of linkage 216.

Figure 4:
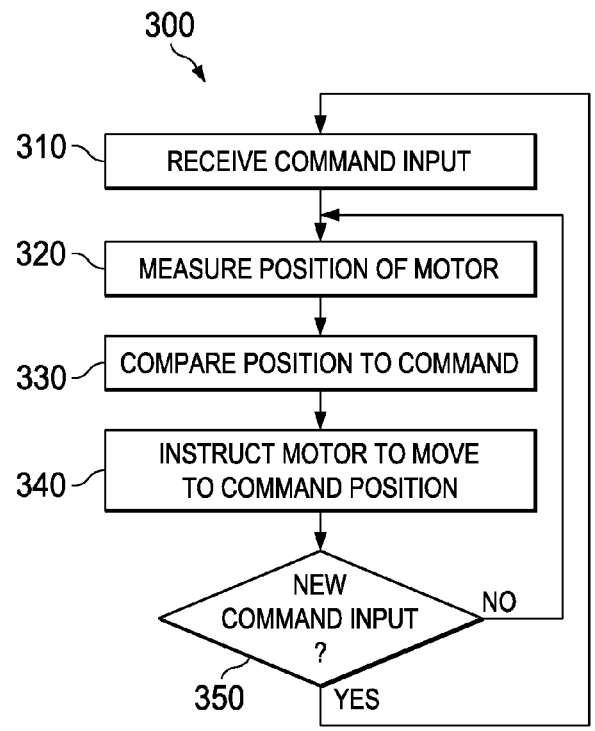
FIG. 4 shows a method of controlling and monitoring the motor of FIG. 3 according to one example embodiment.

FIG. 4 shows a method 300 of controlling and monitoring motor 220 according to one example embodiment. At step 310, a command input is received. In one example, this command input may be provided by a flight control computer. The command input may specify, for example, an output position of motor 220, which is mechanically related to the position of linkage 214. At step 320, the current position of motor 220 is measured. At step 330, the current position of motor 220 is compared with the command input position. At step 340, motor 220 is instructed to move its output position to the command position.

During operation, motor 220 may be subject to various vibrations and other movements. Accordingly, teachings of certain embodiments recognize the capability to periodically remeasure the output position of motor 220 and adjust the output position if it does not match the command position. Accordingly, after step 340, method 300 may return to step 320 even if no new command input is received. If a new command input specifying a new command position is received, then method 300 may return to step 310.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft coupled to the power source;
   a hub coupled to the drive shaft;
   a rotor blade coupled to the hub;
   a blade control system operable to change a position of the rotor blade; and
   a stability augmentation system coupled between the blade control system and a pilot command system, the control augmentation system comprising:
   a master linkage;
   a first linkage coupled between the master linkage and the pilot command system and operable to receive movements representative of pilot commands from the pilot command system;
   a stability augmentation motor operable to generate movements representative of augmentation commands in response to vibrations received from the blade control system;
   a second linkage coupled between the stability augmentation motor and the master linkage and operable to receive the movements representative of augmentation commands from the stability augmentation motor; and
   a third linkage coupled between the blade control system and the master linkage and operable to transmit movements representative of blade position commands to the blade control system in response to the movements representative of pilot commands and the movements representative of augmentation commands.

2. The rotorcraft of claim 1, wherein the third linkage is coupled to the master linkage between the first linkage and the second linkage.

3. The rotorcraft of claim 1, wherein the third linkage is operable to transmit the movements representative of blade position commands to the blade control system as a mechanical sum of the movements representative of the pilot commands and the movements representative of the augmentation commands.

4. The rotorcraft of claim 1, wherein the stability augmentation motor is a linear motor.

5. The rotorcraft of claim 1, wherein the second linkage is coupled to the stability augmentation motor at a first end and to the master linkage at a second end opposite the first end.

6. The rotorcraft of claim 1, wherein the second linkage is operable to transmit torque from the stability augmentation motor to the master linkage without multiplying the torque received from the stability augmentation motor.

7. The rotorcraft of claim 1, wherein the stability augmentation motor is a rotary motor.

8. The rotorcraft of claim 7, wherein the stability augmentation motor is a rotary torque motor operable to provide a constant torque over a limited range of motion.

9. The rotorcraft of claim 1, wherein the blade control system comprises a hydraulic control valve, wherein the third linkage is coupled to a spool associated with the hydraulic control valve.

10. The rotorcraft of claim 9, wherein the blade control system further comprises a hydraulic actuator in fluid communication with the control valve, wherein movement of the spool by the third linkage is operable to change a hydraulic pressure within the hydraulic actuator.

11. The rotorcraft of claim 1, further comprising:
    a second stability augmentation motor; and
    a fourth linkage coupled between the second stability augmentation motor and the master linkage and operable to receive augmentation commands from the second stability augmentation motor.

12. The rotorcraft of claim 11, wherein the second and fourth linkages are coupled to the master linkage at an approximately common location.

13. A stability augmentation system comprising:
    a master linkage;
    a first linkage coupled to the master linkage and operable to receive movements representative of pilot commands;
    a stability augmentation motor operable to generate movements representative of augmentation commands in response to vibrations received from the blade control system;
    a second linkage coupled between the stability augmentation motor and the master linkage and operable to receive movements representative of augmentation commands from the stability augmentation motor; and
    a third linkage coupled to the master linkage and operable to transmit movements representative of blade position commands to a blade control system in response to the movements representative of pilot commands and the movements representative of augmentation commands.

14. The stability augmentation system of claim 13, wherein the second linkage is coupled to the master linkage between the first linkage and the third linkage.

15. The stability augmentation system of claim 13, wherein the third linkage is operable to transmit the movements representative of blade position commands to the blade control system as a mechanical sum of the movements representative of the pilot commands and the movements representative of the augmentation commands.

16. The stability augmentation system of claim 13, wherein the second linkage is operable to transmit torque from the stability augmentation motor to the master linkage without multiplying the torque received from the stability augmentation motor.

17. The stability augmentation system of claim 13, further comprising:
    a second stability augmentation motor; and a fourth linkage coupled between the second stability augmentation motor and the master linkage and operable to receive augmentation commands from the second stability augmentation motor.

\* \* \* \* \*